(12) United States Patent
Scarberry et al.

(10) Patent No.: US 7,007,995 B1
(45) Date of Patent: Mar. 7, 2006

(54) VEHICLE CARGO BED EXTENDER

(75) Inventors: Cliff Scarberry, Fenton, MI (US);
Brian Wright, Metamora, MI (US)

(73) Assignee: Plastech Engineered Products,
Dearborn, MI (US)

( * ) Notice: Subject to any disclaimer, the term of this patent is extended or adjusted under 35 U.S.C. 154(b) by 0 days.

(21) Appl. No.: 10/938,812

(22) Filed: Sep. 10, 2004

(51) Int. Cl.
*B60P 3/34* (2006.01)
(52) U.S. Cl. .................................. 296/26.11; 296/57.1
(58) Field of Classification Search ............ 296/26.11, 296/57.1, 37.6, 26.08, 3, 39.2, 50, 26.09
See application file for complete search history.

(56) References Cited

U.S. PATENT DOCUMENTS

| | | | | |
|---|---|---|---|---|
| 1,454,784 A * | 5/1923 | Gilmore | ................... | 296/26.11 |
| 1,655,797 A * | 1/1928 | Peck | ....................... | 296/26.11 |
| 2,350,050 A * | 5/1944 | Lim | ....................... | 296/26.11 |
| 5,456,511 A * | 10/1995 | Webber | ................... | 296/26.09 |
| 5,911,464 A * | 6/1999 | White | ....................... | 296/26.11 |
| 6,283,525 B1 * | 9/2001 | Morse | ................... | 296/26.11 |
| 6,402,215 B1 * | 6/2002 | Leitner et al. | ............ | 296/26.11 |
| 6,425,618 B1 * | 7/2002 | Garland et al. | .......... | 296/26.11 |
| 6,494,520 B1 * | 12/2002 | Brzenchek et al. | ........ | 296/57.1 |
| 6,513,688 B1 * | 2/2003 | Kmita et al. | .............. | 296/26.11 |
| 6,540,123 B1 * | 4/2003 | Kmita et al. | .............. | 296/26.11 |
| 6,554,340 B1 * | 4/2003 | Stevenson | ................ | 296/26.11 |
| 6,557,918 B1 * | 5/2003 | Iafrate et al. | ............. | 296/26.11 |
| 6,561,560 B1 * | 5/2003 | Brown et al. | ............ | 296/26.11 |
| 6,609,743 B1 * | 8/2003 | Stevenson | ................ | 296/26.11 |
| 6,626,478 B1 * | 9/2003 | Minton | ..................... | 296/26.11 |
| 6,719,345 B1 * | 4/2004 | Ootsuka et al. | .......... | 296/26.11 |
| 6,805,392 B1 * | 10/2004 | Leitner et al. | ............. | 296/57.1 |
| 2002/0153737 A1 * | 10/2002 | Fitts | ........................ | 296/26.11 |
| 2004/0080174 A1 * | 4/2004 | Buelna | .................... | 296/26.11 |

* cited by examiner

*Primary Examiner*—Kiran B. Patel

(57) ABSTRACT

A vehicle cargo bed extender adapted to be used in conjunction with a vehicle having a cargo bed. The present invention includes a pair of sidewalls spaced from one another, a center wall extending between the pair of sidewalls, the pair of sidewalls and the center wall cooperating to define a bed extender having an open end. Each of the pair of sidewalls of the bed extender include a pivot assembly disposed between the sidewall of the bed extender and a sidewall of the cargo bed and including a pivot axis defined by a post, and a slot adapted to slidingly accept the post. The post and the slot cooperate to facilitate both pivotal movement of the bed extender and rectilinear longitudinal movement of the bed extender relative to the cargo bed of the vehicle.

10 Claims, 5 Drawing Sheets

VEHICLE CARGO BED EXTENDER

BACKGROUND OF THE INVENTION

1. Field of the Invention

The present invention relates, generally, to a vehicle cargo bed extender, and more specifically, to a bed extender that includes a sliding pivot joint having a post and a slot that facilitates rectilinear longitudinal movement of the bed extender relative to the cargo bed of the vehicle and pivotal movement of the bed extender between stowed and deployed positions.

2. Description of the Related Art

Pickup trucks are well known vehicles having rear cargo areas that are employed for utilitarian purposes. A representative example of this type of vehicle is generally indicated at 20 in FIG. 1. As is well known in the art, pickup trucks typically include a cab 22 in which the vehicle operator sits and a cargo area, generally indicated at 24. The cargo area 24 is typically disposed adjacent and to the rear of the cab 22. The cargo area 24 is typically defined by a bed 26 and pair of upstanding sidewalls 28 spaced from one another on either side of the bed 26. In addition, the vehicle 20 typically includes a rear wall or "tailgate" 30 that extends between the pair of sidewalls 28 at one end of the bed 26 and a front wall 32 located at the other end of the bed 26 opposite to the tailgate 30. The rear wall or tailgate 30 is usually hingedly mounted to the bed 26 so as to be rotatable between an upright position (FIG. 1) and an extended position as shown in FIG. 2. When it is in its extended position, the tailgate 30 is said to be "down" or "open" and is usually disposed substantially co-planar with the bed 26 of the vehicle cargo area 24. When it is disposed in its upright position, the tailgate 30 extends substantially perpendicularly between the pair of sidewalls 28. In this disposition, together the sidewalls 28, the tailgate 30 and front wall 32 define a perimeter of the vehicle cargo area 24.

Numerous accessories have been developed for the purpose of augmenting the utilitarian functions of the cargo area 24 in such vehicles. For example, toolboxes and other, similar storage devices have been employed to provide a secure enclosure for storing tools and other valuable implements in the otherwise open cargo area 24 of vehicles, such as pickup trucks 20. Such toolboxes and the like are typically mounted between the sidewalls 28 and the front wall 32 proximate to the cab 22 of the vehicle 20. While such toolboxes adequately function for their intended purposes, they also act to reduce the remaining available cargo area 24 of the vehicle 20.

Another common accessory employed in connection with the cargo area of a vehicle such as a pickup truck is known as a "Tonneau Cover". Tonneau covers known in the related art are often constructed of canvas, wood, or metal panels and extend between the upper margins of the sidewalls 28 from the front wall 32 generally to the tailgate 30. Tonneau covers serve to enclose the cargo area 24 thereby providing a modicum of protection for tools and other cargo. Tonneau covers also act to reduce the aerodynamic drag caused by fully uncovered cargo areas. Partial tonneau covers are also known that extend from the front wall 32 but that do not continue the entire distance to the tailgate. These partial covers offer some aerodynamic benefits and also allow easier access to the rearmost portion of the cargo area and tailgate.

Another vehicle accessory that has gained popularity in recent years is generally known as a "Truck Bed Extender". Truck bed extenders known in the related art are usually employed with the tailgate 30 "down" or in the extended position as shown in FIG. 2. The bed extender is mounted to the sidewalls 28 and is supported by the tailgate 30. In this way, truck bed extenders known in the related art serve to increase the effective length of the bed 26 of the pickup truck 20.

Numerous variations on the truck bed extender theme currently exist in the related art. For example, bed extenders are currently in use that are constructed of tubular steel, or aluminum to enclose the area above the tailgate 30 when it is down. Alternatively, several styles of enclosed boxes that stow in the truck bed when not in use and that operatively move out over the tailgate to extend the bed area have been produced. Some of these are structurally robust enough to extend out beyond the end of the tailgate. Still other bed extenders are known in the related art that include a series of light-weight panels that are designed to be foldable when not in use or when the tailgate 30 is disposed in its upright position.

While such bed extenders known in the related art have generally worked for their intended purposes, disadvantages still remain regarding their use for certain vehicle applications. For example, a number of manufacturers are now producing multi-purpose vehicles that combine some of the features of traditional pick-up trucks (FIG. 1) with some of the features of the common forms of sport-utility vehicles (SUVs). These vehicles are referred to as SUV/Pickup crossovers. As shown in FIG. 3, a typical example of one these crossover style vehicles is generally indicated at 40. The crossover vehicle 40 provides the four-place cabin of an SUV and a foreshortened rear bed of a pickup as a cargo area. Similar to the pickup truck of FIG. 1, the crossover vehicle 40 in FIG. 3 also has a cargo area 24 that is defined by a bed 26 and pair of upstanding sidewalls 28 spaced from one another. A tailgate 30 extends between the pair of sidewalls 28 at the rear end of the bed 26 and a front wall 32 is located at the other end of the bed 26 opposite to the tailgate 30. Due to the reduced carrying capacity of the shorter rear bed 26 compared to traditional pickups (FIG. 1), it is desirous to provide these vehicles with bed extenders. However, the shorted rear bed 26 of the crossover vehicle 40 makes the use of conventional truck bed extenders highly problematic. This is due to the fact that a crossover vehicle 40 most often employs some type of bed accessory, such as the tool box 34 or tonneau cover 36 as discussed above, that interferes with the proper deployment of a conventional bed extender.

In addition to the problem of fitting a conventional bed extender in crossover vehicles such as these, it is a particular design and selling feature to provide the vehicle user with the ability to make quick changes from one manner, or mode of use of the vehicle to another. Thus, it is a design intent of the crossover vehicle to provide the user the ability to open the tailgate, quickly place the bed extender, and be ready to use it immediately. To rapidly accomplish the vehicle changeover to the extended bed mode of operation, it is desirable to employ a pivoting bed extender.

In this manner, the extender is pivotably mounted to the bed sidewalls 28 so that it may be lay stowed in the bed, then when desired, be quickly pivoted 180 degrees out over the down tailgate 30 for use. However, for the bed extender to provide the full benefit of a usable extended cargo area, it must generally extend out over the full length of the tailgate 30 in its down position. This means that at minimum, the bed must have the same space available for stowing the extender when it is pivoted back into the bed as it takes up over the tailgate in the extended position. However, additional clearance space in the bed must also be available for the arcuate swing of the extender as it pivots. Furthermore, since the extender pivot points cannot generally be placed at the end of the bed due to interference with closing the tailgate, the bed extender must actually extend farther into the bed when stowed than it extends out over the tailgate when in use. This is where the problem lies.

The shorter bed of a crossover vehicle simply does not have the room to accommodate both the bed extender and an additional accessory such as a toolbox or a tonneau cover without causing interference between them and thereby forcing a departure from the desired quick change features. Thus, employing a conventional bed extender in a crossover vehicle forces the elimination of the pivoting feature and requires an extender that is separate and not generally left mounted to the bed when stowed. This adds the additional drawbacks of several extra time-consuming steps necessary to accomplish the change to the extended bed mode of operation. Furthermore, additional steps are necessary to remove the extender, stow it, and close the tailgate to return to the non-extended mode. This bed extender interference problem occurs regardless of the type of accessory that is employed in the crossover vehicle bed.

Additionally, this problem arises with standard pick-up truck cargo beds in any of a variety of scenarios in which the bed regularly carries or maintains large volume objects and only a small amount of space remains at the end of the bed. In these circumstances it is often desirable to employ a bed extender to carry additional items yet the space to stow a pivotal bed extender is inadequate.

Accordingly, there remains a need in the art for a cargo bed extender that has an improved pivot mounting for use in either a crossover vehicle cargo bed or in a standard pick-up cargo bed where space to stow the extender is limited. Thus, there remains a need in the art for a cargo bed extender that is pivotably moveable between deployed and stowed positions, and is also movable rectilinearly so that only a minimum of space is required to stow the extender in the bed of the vehicle and avoid interference with other objects in the cargo area.

SUMMARY OF THE INVENTION AND ADVANTAGES

The present invention overcomes the disadvantages in the related art in a vehicle cargo bed extender that is adapted to be employed in conjunction with a vehicle having a cargo bed defined by a pair of upstanding bed sidewalls spaced from one another on either side of the vehicle cargo bed. A rear wall is extends between the upstanding sidewalls at one end of the vehicle bed. Furthermore, the rear wall is rotatable from an upright position to an extended position so as to be disposed substantially coplanar with the vehicle bed. Accordingly, the vehicle cargo bed extender of the present invention includes a pair of sidewalls spaced from one another, a center wall extending between the pair of sidewalls, the pair of sidewalls and the center wall cooperating to define a bed extender having an open end.

Each of the pair of sidewalls of the bed extender include a pivot assembly disposed between the sidewall of the bed extender and a respective one of the pair of upright sidewalls of the cargo bed. Each pivot assembly includes a pivot axis and a slot. The pivot axis is defined by a post and the slot is adapted to slidingly accept the post. Thus, the post and the slot cooperate to facilitate rectilinear longitudinal movement of the bed extender relative to the cargo bed of the vehicle and pivotal movement of the bed extender about the pivot axis relative to the cargo bed of the vehicle at at least two different positions along the slot. The slot further includes an opening that operatively allows the post to be engaged to and separated from the slot such that the bed extender may be installed in and removed from the bed of the vehicle.

In this manner, the pivot assembly is operative to facilitate selective rectilinear longitudinal and pivotal movement of the bed extender so that the bed extender is movable between a stowed position wherein the open end of the bed extender is adjacent to the rear wall of the vehicle when the rear wall is in its upright position and a deployed position so as to be supported by the rear wall of the vehicle cargo bed when the rear wall is in its extended position such that the open end of the bed extender faces the cargo bed thereby increasing the effective size of the vehicle cargo bed.

Thus, the vehicle cargo bed extender of the present invention overcomes the drawbacks and disadvantages of the prior art by providing a cargo bed extender that has an improved pivot mounting for use in either a crossover vehicle cargo bed or in a standard pick-up cargo bed where space to stow the extender is limited. Further, the cargo bed extender of the present invention is deployable over a down tailgate gate for use, pivotable on pivot points to readily move to between the deployed and stowed positions, and is also movable rectilinearly so that only a minimum of space is required to stow the extender in the bed of the vehicle and avoid interference with other objects in the cargo area.

Other advantages of the present invention will be readily appreciated, as the same becomes better understood by reference to the following detailed description when considered in connection with the accompanying drawings as described below.

DETAILED DESCRIPTION OF THE PREFERRED EMBODIMENTS

Figure 1:
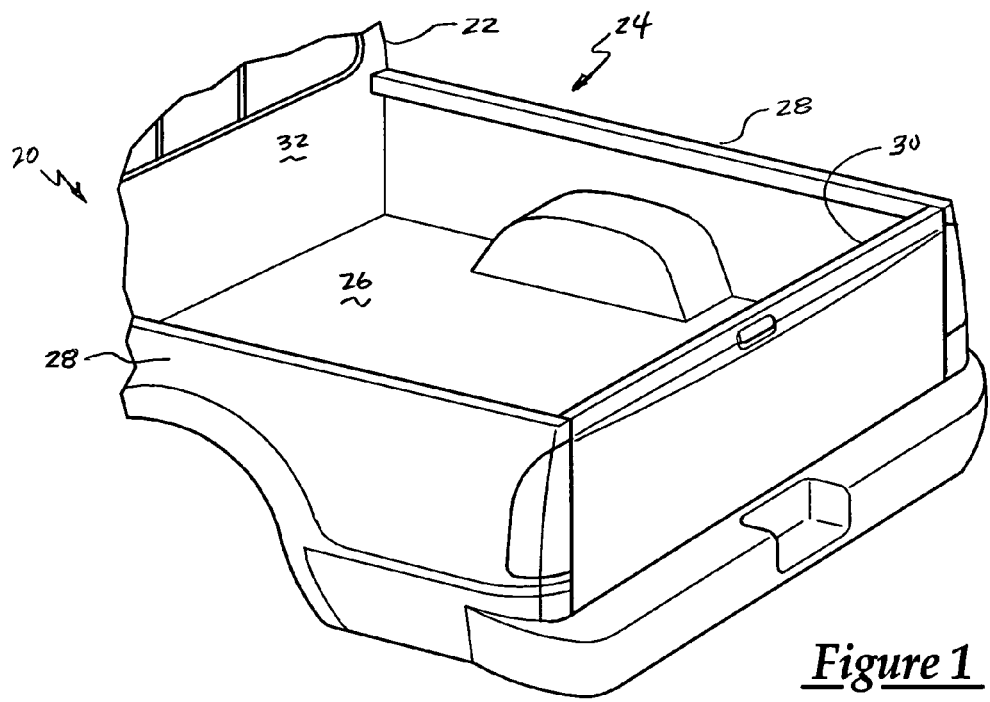
FIG. 1 is a partial perspective view of a pickup type vehicle having a cargo area defined by a pair of sidewalls, a front wall and a rear wall, with the rear wall disposed in its upright "closed" position.
Figure 2:
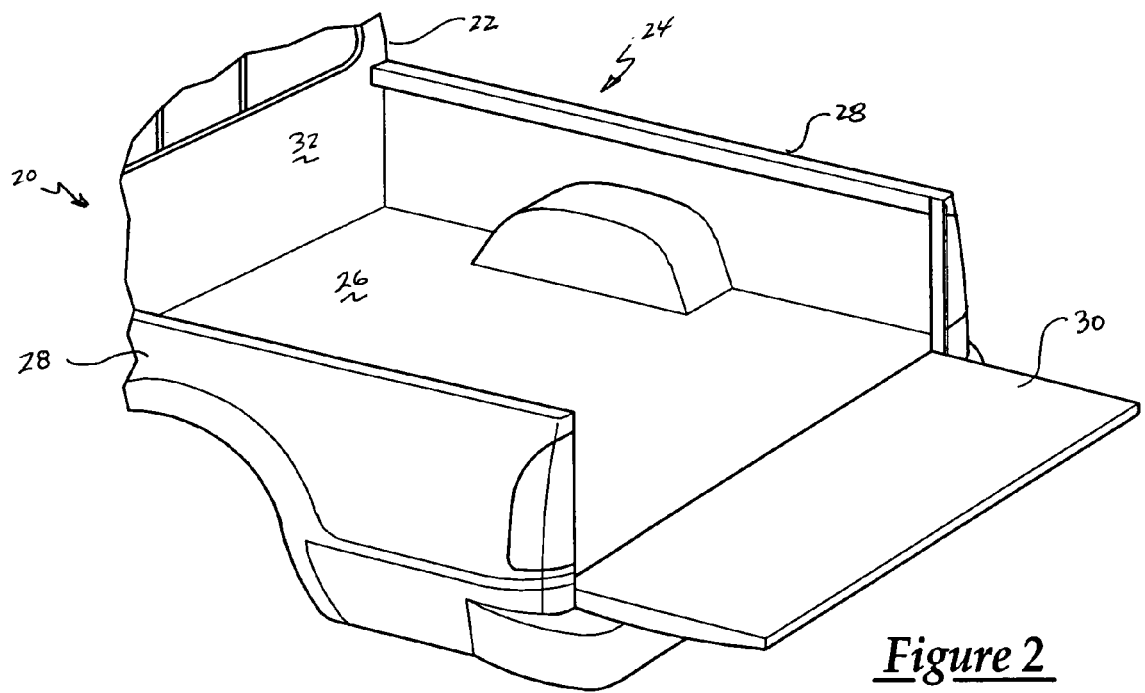
FIG. 2 is a partial perspective view of a pickup type vehicle having a cargo area defined by a pair of sidewalls, a front wall and a rear wall, with the rear wall disposed in its extended, "down" or "opened" position.
Figure 3:
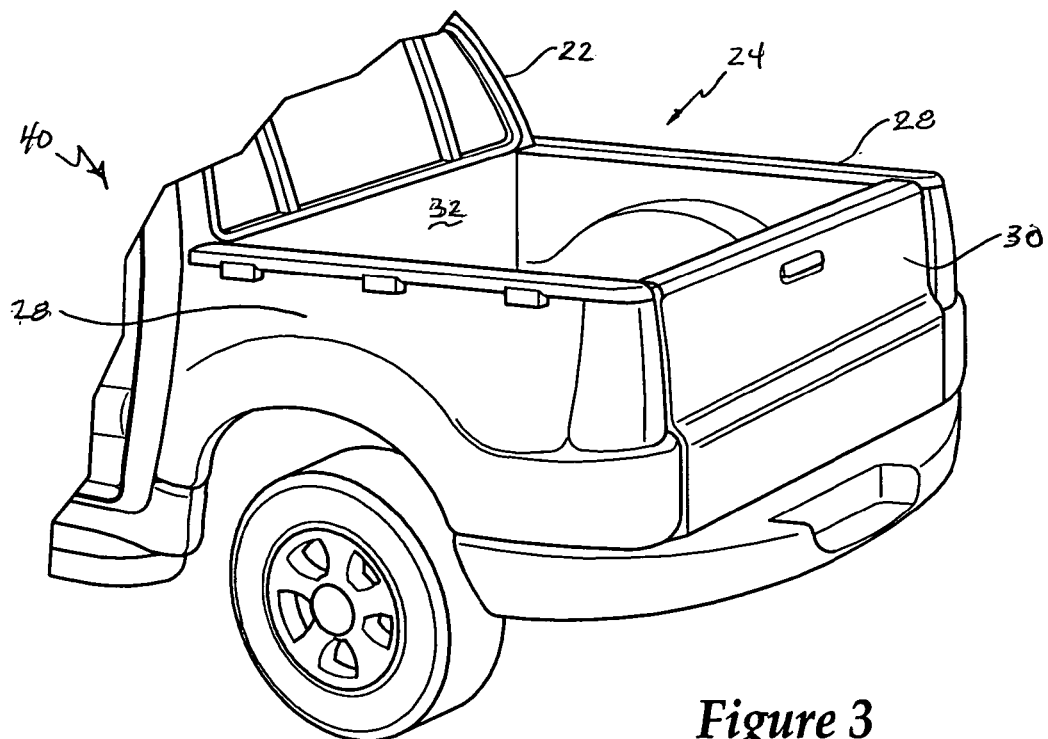
FIG. 3 is a partial perspective view of a crossover type vehicle having a cargo area defined by a pair of sidewalls, a front wall and a rear wall, with the rear wall disposed in its upright "closed" position.
Figure 4:
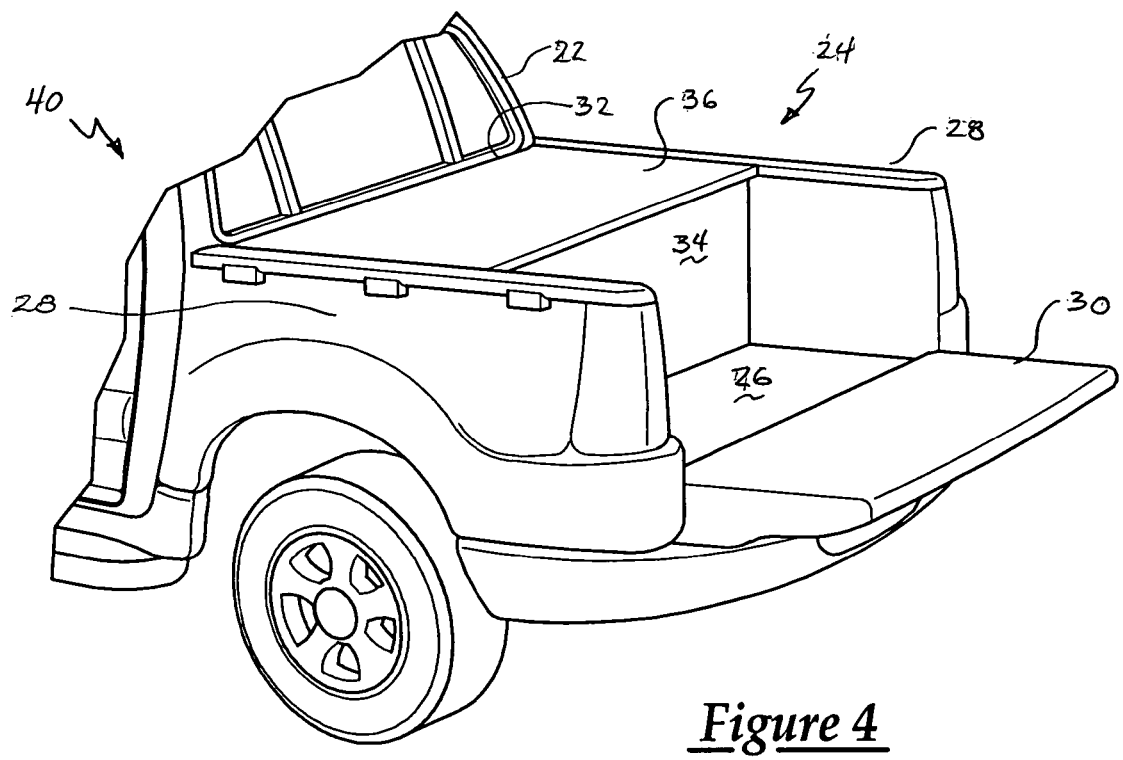
FIG. 4 is a partial perspective view of a crossover type vehicle having a cargo area defined by a pair of sidewalls, a front wall and a rear wall, with the rear wall disposed in its extended, "down" or "opened" position.
Figure 5:
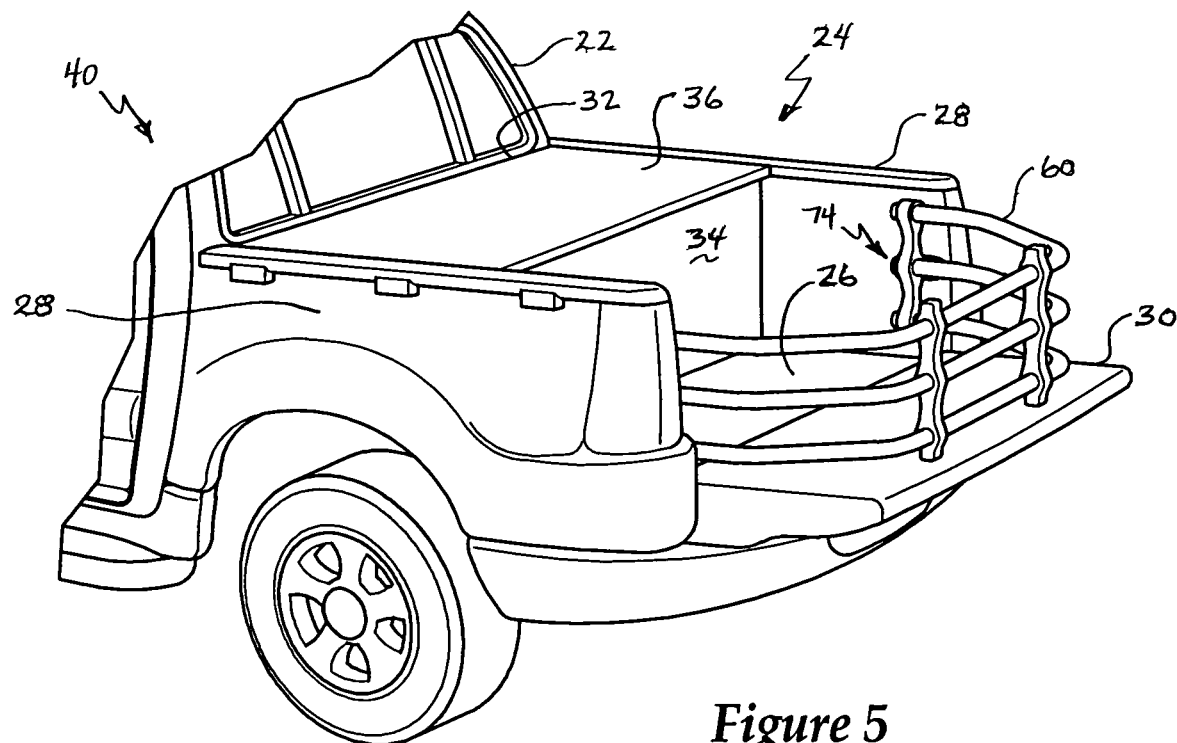
FIG. 5 is a partial perspective view of a crossover type vehicle with the rear wall disposed in its extended, "down" or "opened" position illustrating a bed extender of the present invention in its deployed position.

With the foregoing description of the related art in mind, the present invention is a vehicle cargo bed extender, generally indicated at 60 in FIGS. 5–10, where like numerals are used to designate like structure throughout the drawings. The vehicle cargo bed extender 60 is adapted to be employed in conjunction with a SUV/Pick-up cross-over style vehicle 40 as generally illustrated in FIGS. 3–6. However, those having ordinary skill in the art should appreciate that the present invention may also be employed in a standard pick-up truck style vehicle 20 as illustrated in FIGS. 1 and 2. As noted above, similar to standard pick-up truck designs, SUV/Pick-up cross-over vehicles 40 typically have a cargo area 24 defined by a bed 26 and a pair of upstanding sidewalls 28 spaced from one another on either side of the vehicle bed 26. In addition, the cargo area 24 is defined by a rear wall 30 extending between the upstanding sidewalls 28 at one end of the vehicle bed 26. The rear wall 30 is typically rotatable from an upright position to an extended position so as to be disposed substantially coplanar with the vehicle bed 26.

Figure 8:
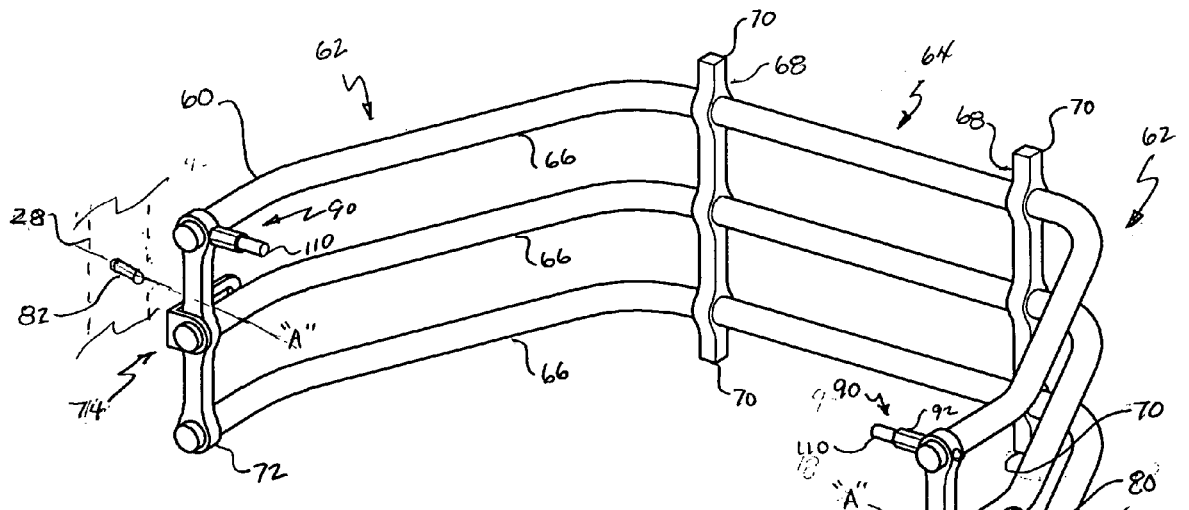
FIG. 8 is a perspective view of a bed extender of the present invention.

As best shown in FIG. 8, the cargo bed extender 60 of the present invention includes a pair of sidewalls, generally indicated at 62, spaced from one another and a center wall, generally indicated at 64, extending between the pair of sidewalls 62. The pair of sidewalls 62 and the center wall 64 cooperating to define a bed extender 60 having an open end. It should be appreciated that the walls 62 and 64 of the bed extender may constructed in a number of different manners. For example, the center wall of the bed may be constructed of a plurality of tubular members disposed longitudinally between rigid sidewalls. However, as shown in the Figures, the preferred embodiment the bed extender 60 includes a plurality of continuously formed tubular members 66 disposed longitudinally with respect to the vehicle bed 26 to form sidewalls 62 and a center wall 64 as a continuous piece.

To provide support for the tubular members 66, the bed extender 60 includes a pair of support members 68. The support members 68 are disposed on the center wall 64 near the respective sidewalls 62 and perpendicular to the tubular members 66. The support members 68 integrate the tubular members 66 and structurally support the bed extender 60. Further, the support members 68 have resilient members 70 disposed at either end to provide a non-marring contact between the extender 60 and the rear wall 30 when the extender 60 is deployed, and between the extender 60 and the vehicle bed 26 when stowed. It should be appreciated that the bed extender 60 may include additional support members spaced about the sidewalls 62 and center wall 64 if it is desired to provide additional support for the tubular members 66. The bed extender 60 also includes a pair of end members 72. Each end member 72 is disposed upon the bed extender sidewall 62 opposite the center wall 64 and is adapted to support the bed extender 60 at its open end.

Figure 6:
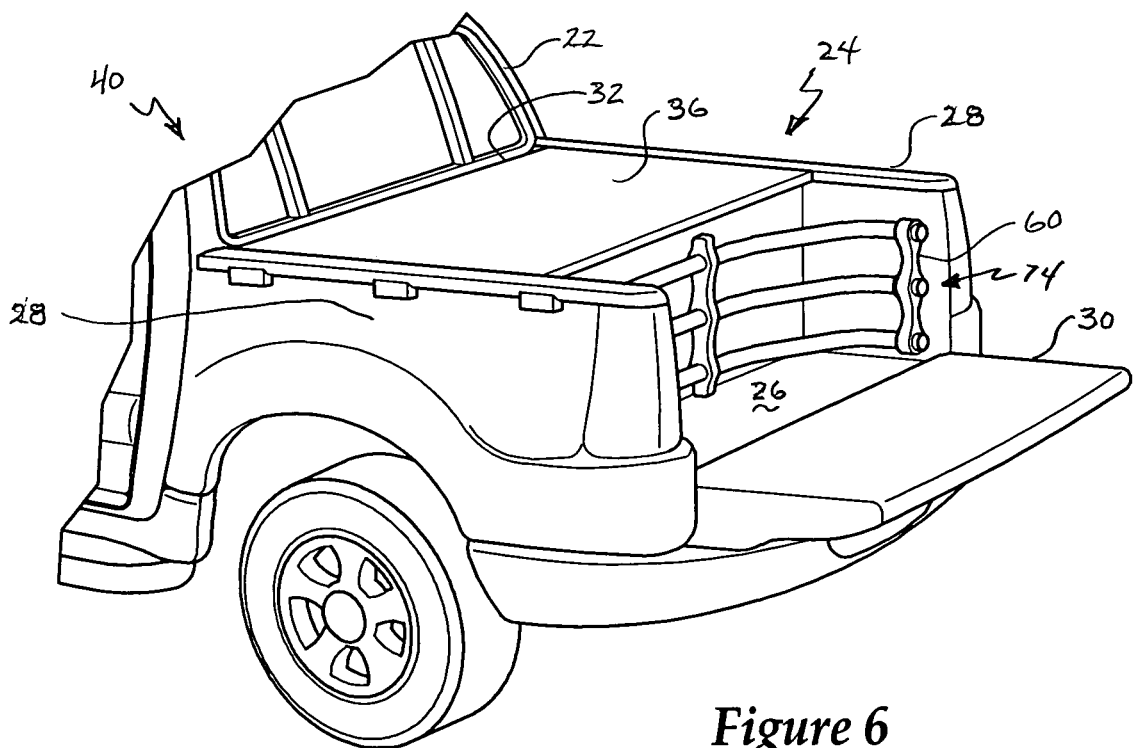
FIG. 6 is a partial perspective view of a crossover type vehicle with the rear wall disposed in its extended, "down" or "opened" position illustrating a bed extender of the present invention in its stowed position.

Generally speaking, the vehicle cargo bed extender 60 of the present invention is movably mounted between a deployed position (FIG. 5) and a stored position (FIG. 6). More specifically, the vehicle cargo bed extender 60 of the present invention is pivotably mounted to the vehicle sidewalls 62 such that it is pivotable between a stored position and a deployed position. To this end, each of the pair of sidewalls 62 of the bed extender 60 includes a pivot assembly, generally indicated in the Figures at 74. The pivot assembly 74 is disposed between the sidewall 62 of the bed extender 60 and a respective one of the pair of upright sidewalls 28 of the cargo bed 26. The pivot assembly 74 facilitates selective pivotal movement of the bed extender 60 between a stowed position (FIG. 6) wherein the open end of extender 60 is adjacent to the rear wall 30 of the vehicle when the rear wall 30 is in its upright position, and a deployed position (FIG. 5) so as to be supported by the rear wall 30 of the vehicle cargo bed when the rear wall 30 is in its extended position. When in the deployed position, the open end of the bed extender faces the cargo bed 26 thereby increasing the effective size of the vehicle cargo bed 26. It should be appreciated that in a broader sense, the pivot assembly 74 may be formed in any number of ways to facilitate a pivoting functionality of the bed extender 60. For example, the sidewalls 28 of the vehicle and the extender end members 72 may include cooperative openings in which a pivot pin is received to provide a pivot axis, or posts that extend from the vehicle sidewalls 28 to receive openings formed in the extender end members 72 may be provided.

As best shown in FIGS. 7A–10 the pivot assembly 74 is disposed between the sidewall 62 of the bed extender 60 and a respective one of the pair of upright sidewalls 28 of the cargo bed 26. Each pivot assembly 74 includes a pivot axis "A" and a slot 80. The pivot axis "A" is defined by a post 82 with the slot 80 adapted to slidingly accept the post 82. The post 82 and the slot 80 cooperating to facilitate rectilinear longitudinal movement of the bed extender 60 relative to the cargo bed 26 of the vehicle 40 and pivotal movement of the bed extender 60 about the pivot axis "A" relative to the cargo bed 26 of the vehicle at at least two different positions along the slot 80.

Figure 9:
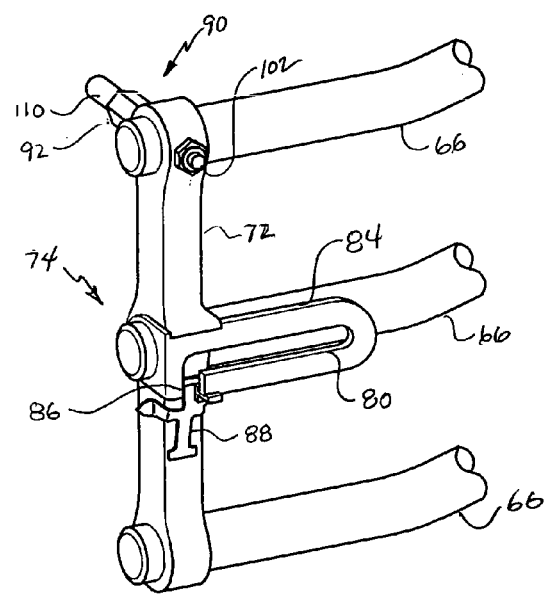
FIG. 9 is an enlarged partial perspective view of a portion of a bed extender of the present invention shown in detail illustrating the pivot assembly.
Figure 10:
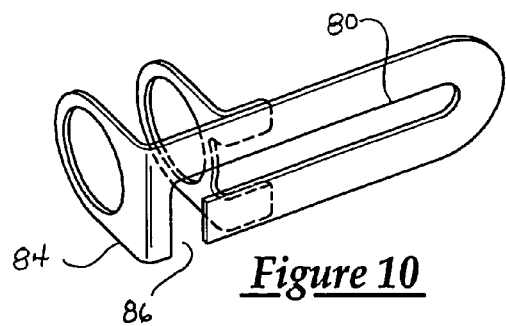
FIG. 10 is a perspective view of a portion of a pivot assembly of the present invention.

As shown in FIGS. 9 and 10, in the preferred embodiment, the slot 80 is formed in a slide bracket 84 that mounts to the end member 72 about the central tubular member 66. The slot 80 further includes an opening 86 that operatively allows the post 82 to be engaged to and separated from the slot 80 such that the bed extender 60 may be installed and removed from the vehicle. A retaining member 88 is further included that is mounted to the end member 72. The retaining member 88 is formed of a rigid yet flexible or resilient material, such as spring steel for example. As illustrated in the figures, the retaining member 88 is a steel clip. The retaining member 88 is adapted to extend from the end member 72 to close the opening 84 to retain the post 82 within said slot 80. The resilient member 88 is further adapted to be selectively deflectable to allow the post 82 to pass through the opening 84 when the retaining member 88 is deflected. Thus, the vehicle cargo bed extender 60 of the present invention may be removed from the vehicle only when the retaining members 88 are depressed and deflected thereby allowing the post 82 to move past the opening 86. This additionally allows for ease of installation when the bed extender 60 has been removed.

The bed extender 60 can be easily installed on a vehicle by placing it at the rear of the cargo area 26 such that the openings 86 align over the posts 82 in the respective sidewalls 28 of the vehicle. Then, the bed extender 60 is pushed downward so that the posts 82 cause the retaining members 88 to be deflected so that the slots 80 accept the posts 82. The retaining members 88 then return to their original position and retain the posts 82 within the slots 80 of the slide bracket 84.

The bed extender 60 may also include a lock and retaining assembly, generally indicated at 90, at its open end extending through end member 72 and one of the tubular members 66. It should be appreciated that the lock mechanism 90 may take on any of a variety of forms but in the preferred embodiment the present invention employs a lock mechanism that substantially similar to that which is described in applicant's co-pending application Ser. No., 10/938,166, entitled "Vehicle Cargo Bed Extender Having a Pin Lock Assembly" which is hereby incorporated in its entirety by reference. The lock assembly 90 includes a main body 92, locking pin 102, and a handle 110. Selective movement of the handle 110 causes the lock assembly 90 to operatively extend and retract to engage with and disengage from the vehicle sidewall 26 in both the deployed and stowed positions.

Figure 7A:
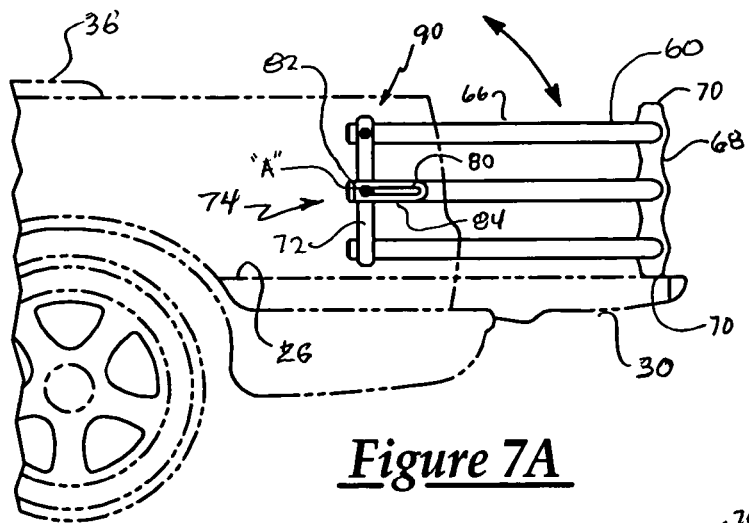
FIG. 7A is a partial side view of a crossover type vehicle with the rear wall disposed in its extended, "down" or "opened" position illustrating a bed extender of the present invention in its deployed position.
Figure 7B:
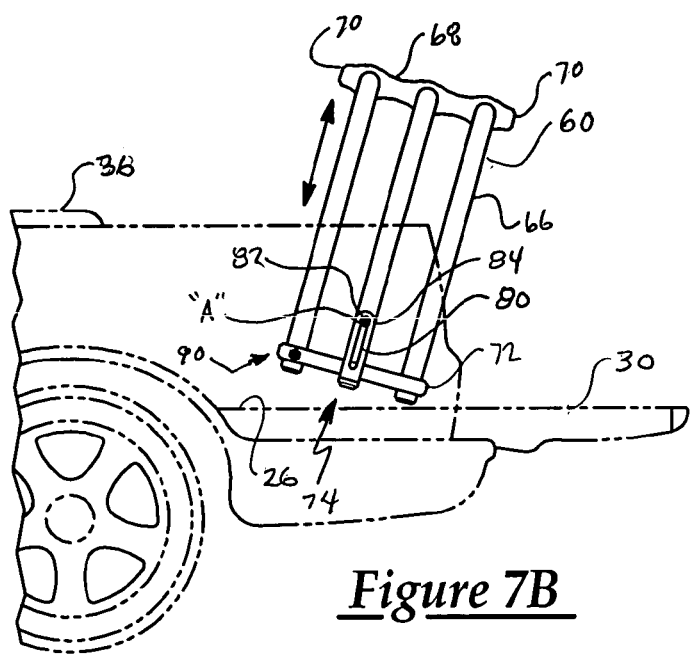
FIG. 7B is a partial side view of a crossover type vehicle with the rear wall disposed in its extended, "down" or "opened" position illustrating a bed extender of the present invention moved to an intermediate position.
Figure 7C:
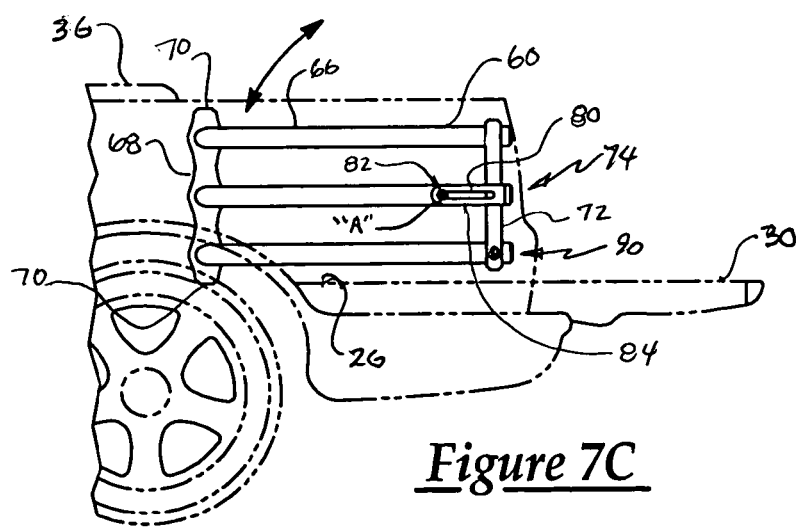
FIG. 7C is a partial side view of a crossover type vehicle with the rear wall disposed in its extended, "down" or "opened" position illustrating a bed extender of the present invention in its stowed position.

FIGS. 7A–7C illustrate how the present invention is moved from its deployed position, in which it is extended over the tailgate 30, to its stowed position in the cargo bed 26. In FIG. 7A, the bed extender 60 rests in the deployed position. The bed extender 60 has been moved fully to the right, as shown in the illustration so that the pivot axis "A", defined by post 82 is at the end of the slot 80 in the slide bracket 84 closest to the open end of the extender 60. When the bed extender 60 is used in the deployed position, the lock assembly 90 will be engaged to the vehicle sidewall 26 to lock the extender 60 in place and prevent any uncommanded movement. It should be appreciated that more than one lock assembly 90 may be employed and in the preferred embodiment one lock assembly is employed on each side of the bed extender 60. When it is desired to stow the bed extender 60, the lock assembly 90 is disengaged from the vehicle side wall 26 and the extender is pivoted upward about the post 82 at pivot axis "A" as indicated by the arrow in FIG. 7A.

As shown in FIG. 7B, as the bed extender 60 nears the apex of its pivotal movement, it is moved rectilinearly downward as indicated by the arrow so that the slot 80 of the slide bracket 84 moves along the fixed post 82. It should be appreciated that the bed extender 60 may also be move rectilinearly along the slot 80 at any time during the pivotal movement from the deployed position to the generally upright position shown in FIG. 7B. Then, as shown in FIG. 7C, the bed extender 60 will have adequate clearance to avoid interference with a bed accessory, such as the tonneau cover 36 in the figures for example. At this point, the lock assembly 90 is reengaged with the vehicle sidewall 26 to lock the extender 60 in place.

Thus, the vehicle cargo bed extender of the present invention overcomes the drawbacks and disadvantages of the prior art by providing a cargo bed extender that has an improved pivot mounting for use in either a crossover vehicle cargo bed or in a standard pick-up cargo bed where space to stow the extender is limited. Further, the cargo bed extender of the present invention includes a pivot assembly having a post and a slot that cooperate to provide pivotable movement and to facilitate rectilinear longitudinal movement of the bed extender relative to the cargo bed. In this manner, the bed extender is pivotable between a deployed position over a down tailgate gate and a stowed position in the bed, while having rectilinear movement that allows the bed extender to be stowed in the bed with only a minimum of required space and avoid interference with other objects in the cargo area.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

We claim:

1. A vehicle cargo bed extender adapted to be employed in conjunction with a vehicle having a cargo bed defined by a pair of upstanding bed sidewalls spaced from one another on either side of the vehicle cargo bed and a rear wall extending between the upstanding sidewalls at the rear end of the bed, wherein the rear wall is rotatable from an upright position to an extended position so as to be disposed substantially co-planar with the vehicle bed, said cargo bed extender comprising:

a pair of sidewalls spaced from one another, wherein said side walls generally define at least one longitudinal extender axis;

a center wall extending between said pair of sidewalls, said pair of sidewalls and said center wall cooperating to define a bed extender having an open end;

each of said pair of sidewalls of said bed extender including a pivot assembly disposed between said sidewall of said bed extender and a respective one of the pair of upright sidewalls of the cargo bed, each pivot assembly including a pivot axis and a slot, said pivot axis defined by a post, and said slot adapted to slidingly accept said post, said slot further including an opening that operatively allows said post to be engaged to and separated from said slot such that said bed extender may be installed and removed from the bed of the vehicle, wherein the pivot axis is generally perpendicular to the longitudinal extender axis;

said pivot assembly operative to facilitate selective rectilinear movement of said bed extender and pivotal movement between a stowed position and an extended position, wherein at least a portion of said bed extender selectively translates generally parallel to the longitudinal extender axis during the pivotal movement and as a result of the rectilinear movement, and wherein said open end of said bed extender is adjacent to the rear wall of the vehicle when the rear wall is in its upright position and a deployed position so as to be supported by the rear wall of the vehicle cargo bed when the rear wall is in its extended position such that the open end of said bed extender faces the cargo bed thereby increasing the effective size of the vehicle cargo bed.

2. A vehicle cargo bed extender as set forth in claim 1 wherein said post of said pivot assembly is mounted to the sidewall of the vehicle bed.

3. A vehicle cargo bed extender as set forth in claim 1 wherein said slot of said pivot assembly is formed on said sidewall of said post mounted to said sidewall of the vehicle.

4. A vehicle cargo bed extender as set forth in claim 1 wherein said pivot assembly further includes a retaining member that is mounted to said end member, said retaining member made of a resilient material and adapted to extend from said end member to close said opening in said slot to retain said post within said slot, said retaining member further adapted to be selectively deflectable to allow said post to pass through said opening in said slot when said retaining member is deflected.

5. A vehicle cargo bed extender as set forth in claim 1 wherein said bed extender further includes a lock assembly that is mounted to said extender and adapted to lock said extender to the vehicle sidewall when said bed extender is deployed and when said bed extender is stowed.

6. A vehicle cargo bed extender as set forth in claim 1 wherein said sidewalls of said extender are constructed of a plurality of tubular members disposed longitudinally with respect to the vehicle bed.

7. A vehicle cargo bed extender as set forth in claim 1 wherein said center wall of said extender is constructed of a plurality of tubular members disposed longitudinally between said sidewalls of said extender.

8. A vehicle cargo bed extender as set forth in claim 1 wherein said sidewalls and said center wall of said extender are a plurality of continuously formed tubular members disposed longitudinally with respect to the vehicle bed.

9. A vehicle cargo bed extender as set forth in claim 1 which further includes a pair of end members, each said end member disposed upon said extender sidewall opposite said center wall, said end member adapted to support said bed extender at said open end.

10. A vehicle cargo bed extender as set forth in claim 1 which further includes at least a pair of support members, each said support member having resilient members disposed at either end so as to provide a non-marring contact between said extender and said rear wall when deployed, and between said extender and said vehicle bed when stowed.

* * * * *